US007153593B1

(12) United States Patent
Waterbury

(10) Patent No.: US 7,153,593 B1
(45) Date of Patent: Dec. 26, 2006

(54) HIGH BRIGHTNESS PHOSPHORESCENT PANEL

(75) Inventor: Mark C Waterbury, Bowling Green, OH (US)

(73) Assignee: Cleveland C. Smith, Helena, MT (US)

( * ) Notice: Subject to any disclaimer, the term of this patent is extended or adjusted under 35 U.S.C. 154(b) by 9 days.

(21) Appl. No.: 10/423,632

(22) Filed: Apr. 24, 2003

Related U.S. Application Data

(60) Provisional application No. 60/375,067, filed on Apr. 24, 2002.

(51) Int. Cl.
*H05B 33/12* (2006.01)
*C09K 11/08* (2006.01)

(52) U.S. Cl. ................. 428/690; 428/917; 252/301.36; 40/542; 40/543

(58) Field of Classification Search ................ 428/690, 428/917, 332, 913; 252/301.36; 350/105, 350/484.4; 40/542, 543; 250/404.6; 429/917
See application file for complete search history.

(56) References Cited

U.S. PATENT DOCUMENTS 4,763,985 A * 8/1988 Bingham .................... 359/518
5,223,330 A 6/1993 Vockel, Jr. et al.
5,424,006 A 6/1995 Murayama et al.
5,607,621 A * 3/1997 Ishihara et al. ........ 252/301.36
5,674,554 A 10/1997 Liu et al.
5,674,605 A * 10/1997 Marecki ..................... 428/325
5,692,327 A 12/1997 Wynne et al.
5,698,301 A 12/1997 Yonetani
5,811,174 A * 9/1998 Murakami ............... 428/195.1
5,830,548 A 11/1998 Andersen et al.
5,997,992 A 12/1999 Paul
6,048,595 A * 4/2000 Nakajima et al. .......... 428/40.1
6,145,512 A * 11/2000 Daley ........................ 132/76.4
6,207,077 B1 3/2001 Burnell-Jones
6,279,180 B1 8/2001 Bell et al.
6,338,892 B1 1/2002 McCue et al.
6,358,563 B1 3/2002 van Duynhoven
2002/0019312 A1* 2/2002 Ramsden .................... 503/227

* cited by examiner

*Primary Examiner*—Rena Dye
*Assistant Examiner*—Camie S Thompson
(74) *Attorney, Agent, or Firm*—Todd N. Hathaway

(57) ABSTRACT

The invention describes an article of manufacture that comprises an optimized phosphorescent laminate structure that produces much brighter light than previously disclosed phosphorescent laminates or coatings by enabling and capturing multiple emissions and reflections of light emitted by phosphorescent particles that are distributed through the thickness of a transparent layer. These multiple emissions are enabled by providing a transparent carrier layer that is many times as thick as the phosphorescent powder particle size. That layer is loaded with an amount of phosphorescent powder that is low enough to allow light emitted by the deeper layers of powder to escape, but high enough to provide a very large amount of emitting powder. This structure may be protected by surface films and backed by a reflective layer for efficient unidirectional light absorption and emission.

18 Claims, 7 Drawing Sheets

HIGH BRIGHTNESS PHOSPHORESCENT PANEL

This application claims the benefit of U.S. Provisional Application No. 60/375,067, filed on Apr. 24, 2002.

BACKGROUND a. Field of the Invention

This invention relates to phosphorescent panels used to provide low level lighting for such activities as emergency evacuation, camping, hunting, military missions, novelty items, and other nighttime activities.

b. Related Art

The present invention addresses the need for brighter phosphorescent panels for such applications as camping, hunting, military missions, emergency building exit guides, night lighting in homes and business, and novelty uses. The invention produces substantially brighter emissions per unit area than even a completely solid layer of phosphorescent material, or than any previously described laminate structure, by enabling, capturing, and directing multiple emissions and reflections from phosphorescent particles ("phosphor").

Phosphorescent materials absorb light that is incident upon them, raising the outermost electrons in their structure to higher energy levels. These electrons are left locked in these high energy levels, or orbitals, because it is a "spin forbidden" energy transition for them to drop back to their rest levels, that is, a change in electronic spin properties would be required, and this cannot readily occur. Because of this lock in to high-energy orbitals, the phosphor material remains "charged" for extended periods of time.

Over that extended period, second order transitions occur which allow the electrons to return to their resting energy orbitals, emitting light in the process. By this mechanism, phosphorescent materials absorb incident light and then emit over an extended period of time, in the range from minutes, to hours. The decay in light emission typically follows an exponential law, giving high emission initially, then rapidly dropping off over the first minute or so, then very slowly diminishing over a longer period of time.

The most common representative of traditional phosphorescent materials is zinc sulfide (ZnS), which provides a visible glow for a period of a few tens of minutes and is widely used in novelty items. The utility of this phosphorescent material has been limited because of its low light output and short duration of light output.

Improved phosphorescent materials that have recently been invented (e.g., U.S. Pat. No. 5,424,006) provide much greater light emission, and longer light emission, than do previous phosphor materials such as zinc sulfide. These improved phosphors, generally comprising strontium aluminate ($SrAl_2O_4$) or related compounds in crystals with various doping elements added, emit on the order of ten times as much light as ZnS, and do so for on the order of ten times as long. This increased light output creates opportunities for the development of many new applications for phosphorescent materials and is the critical advantage of these new phosphor materials.

A new class of phosphorescent material with greatly improved light output, duration of light output, and resistance to fading from ultraviolet light was disclosed by Murayama, et al in U.S. Pat. No. 5,424,006. These materials make possible a wide range of improved phosphorescent articles and extend the range of usefulness of said materials into new application fields. This patent does not, however, provide any suggestion for increasing the luminance by controlled distribution through a thick laminate structure.

Even with these increased light outputs, however, the light emitted by any phosphorescent material is still dim compared with typical room lighting levels, or even in comparison with moonlight. Any method of further increasing the brightness of light output and duration of light output from these materials is therefore highly desirable. A high brightness phosphorescent panel would increase the visibility of emergency building exit markers, aircraft low level lighting strips, household night light markers to avoid foot injuries and falls, camping and sporting lights, and military markers.

It is clear that the utility of phosphorescent products used as safety markers, emergency lighting, and for camping and military purposes is often tied to their intensity of light emission. This light emission, in turn, is a complex function of the phosphor particle size, the particle concentration, the particle distribution within the emitting body, and other geometric factors.

The prior art of fabrication of phosphorescent sheets and panels has been limited by a lack of understanding of these factors. For instance, U.S. Pat. No. 5,698,301 teaches the fabrication of a phosphorescent article with a thin phosphorescent layer with a very high concentration of phosphor powder. In particular, this patent cites a desirable thickness for a covering layer, a layer containing phosphorescent powder, and a reflective layer of between 70 and 600μ, with the thickness of the phosphor-bearing layer being preferably from 100 to 400μ. In fact, U.S. Pat. No. 5,698,301 specifically teaches that phosphor layer thickness above about 200μ are of no use because "no proportionate improvement in such characteristics as quickness of excitation, luminance, or afterglow property" will result from increasing thickness.

Furthermore, U.S. Pat. No. 5,698,301 cites a desirable concentration range for the phosphor powder in the carrier layer of between 70% to 85% by weight. It will be shown below that such a high concentration, while desirable in the thin layer taught in U.S. Pat. No. 5,698,301, would substantially reduce the brightness of the phosphor panel disclosed in the present invention.

Numerous other patents such as U.S. Pat. Nos. 5,674,554 and 6,048,595 teach the construction of similarly thin layers, on the order of 30 to 80μ, of high concentration phosphorescent powder. It will be shown that the present invention provides a significantly brighter phosphorescent laminate than any of these prior inventions, on the order of 200–300%, by exploiting an improved understanding of the relationship between surface brightness and phosphorescent particle size, concentration, distribution, panel thickness, and reflective backings. This improvement is of a somewhat surprising nature, contradicting the design principles outlined in the prior art, and was clearly not anticipated in any of the above, or other references.

Another typical thin phosphorescent layered structure is disclosed in U.S. Pat. No. 6,048,595, which describes a printed article with a printed phosphorescent substrate. The thickness of the substrate is 50 to 150 microns and the phosphor concentration is on the order of 50–80 weight percent (wt %). Such a thin phosphorescent layer will produce only a small fraction, on the order of 25–35% of the luminosity of the present invention.

Similarly, the phosphorescent laminate disclosed in U.S. Pat. No. 5,698,301 describes a phosphorescent layer that is about 50 to 200 microns thick and consists of 70 to 85 wt % phosphorescent material. Such a thickness and concentration of phosphorescent material produces only a single layer of phosphorescent emission, and results in an article only 25 to 40% as bright as the present invention. Nowhere in U.S. Pat. No. 5,698,301 is there any anticipation that deliberately separating phosphor particles by lowering the concentration, and building up many effective layers of low dilution phosphor particles, can result in a higher performance phosphorescent panel as disclosed in the present invention.

Similarly, a phosphorescent laminate is taught in U.S. Pat. No. 5,830,548, which describes methods for producing a calendared laminate structure panel, but said panels are coated with a phosphorescent material, rather than having such material distrubuted through the panel thickness for higher luminosity, as with the present invention.

Applications for luminescent panels are described by many patents, and attest to the usefulness of the present invention since most will benefit from the higher luminosity afforded by said invention. For example, U.S. Pat. No. 5,692,327 describes an application involving luminous license plates for vehicles.

A glow-in-the-dark commode is described in U.S. Pat. No. 6,279,180, which uses phosphorescent panels to provide better night time visualization. The patent does not describe the construction of said panels aside from mentioning an adhesive layer for affixing the panels.

A phosphorescent imaging panel is taught in U.S. Pat. No. 6,338,892. The invention involves an image receiving layer superimposed over a phosphorescent layer. The phosphorescent layer taught comprises a 1 mil thick layer of Luminova™ phosphorescent ink, said layer being substantially less bright than the present invention.

Phosphorescent novelty cards are disclosed in U.S. Pat. No. 5,997,992, having a printed layer over a phosphorescent layer. No mention is made of the details of the structure of the phosphorescent layer with regards to thickness, phosphor distribution, reflective backing layer, or resultant luminosity.

Phosphorescent signage is described in U.S. Pat. No. 6,358,563, and is produced by a phosphorescent paint with a castor oil carrier. Such paint would have insufficient thickness to generate the high luminosity of the present invention.

A fiber-based composite material is coated with a phosphorescent gel coat in U.S. Pat. No. 5,223,330. Again, the phosphorescent layer is very thin, being applied by silk screening or like means, and is insufficient to produce high luminosity by the mechanism of the present invention.

Similarly, an improved formulation for a composite gel coat material bearing a phosphorescent powder is disclosed in U.S. Pat. No. 6,207,077, but said gel coat layers are very thin and do not have the appropriate phosphor concentration to produce a high brightness laminate. Nowhere in that disclosure is there any anticipation that emission brightness can be enhanced by the mechanism of the present invention.

A method for depositing a very thin layer of phosphor powder for CRT screens and like applications is disclosed in U.S. Pat. No. 5,674,554. Again, although a laminate structure involving phosphorescent material is described, the aim is to produce a thin, solid layer of powder, in contrast to the present invention.

SUMMARY OF THE INVENTION

The present invention provides a phosphorescent article comprising a transparent layer in which phosphorescent particles ("phosphor") is distributed, the thickness of the transparent layer being many times the particle size of said phosphorescent particles, and which is loaded with said phosphorescent particles to an extent great enough to provide a very large amount of phosphorescent particles. Further, the phosphor powder loading is less than a predetermined maximum amount so as not to block emissions from deeper layers of said phosphor.

Preferably, the thickness of the transparent layer is on the order of 50 to 200 times the dimensions of said phosphor powder. The loading of the phosphor within the layer is preferably between about 8% and 15% by volume, with 10% by volume being generally optimal. This provides between 5 and 10 times as much phosphor as would be present in the thin, single layers of phosphor disclosed in the prior art, and results in 2–3 times as much light output per unit area of phosphorescent panel. In this manner, the present invention allows for a small trade off in efficiency of phosphorescent material usage in exchange for a significant and useful increase in light emission.

The transparent layer may be backed by a reflective layer to increase efficiency if a one directional lighting panel is desired, and protected by a transparent front film layer to exclude moisture and other destructive agents.

DETAILED DESCRIPTION

Phosphorescent material comes in the form of a fine ceramic powder, typically between 5 and 50 microns average particle size. For practical use, these particles must be either suspended within some optically transparent or translucent matrix material, or be affixed to a surface. Phosphor particles affixed to a surface can only achieve limited brightness because their emissions are effectively limited to a single layer of material. Achievement of higher emissions requires that the material be suspended within a transparent or translucent material so that the greater amount of light emitted from multiple particles can be combined by multiple reflection and emission.

In a preferred embodiment of the present invention, an ultraviolet (UV) light excluding material is used as the topmost layer of the laminate structure. By this means, the body of the laminate is protected from damage from UV, which can destroy polymer structures and degrade phosphor performance. Such filtering materials are commonly available in laminating films for the protection of graphic images.

In another preferred embodiment of the present invention, the bottom surface of the topmost film layer in the laminate structure may be surface treated, as with corona treatment, and coated to enhance adhesion to the inner layers of the laminate structure. This may be achieved, for example, by casting the inner layer incorporating the phosphor material between sheets of a standard, commercial laminating film that incorporates a UV rejection property and coating to promote adhesion of the laminating film. Laminate structures produced by these means are substantially more robust and durable in harsh service environments.

The brightness, and therefore utility of such a phosphor emission is a function of several variables, including the matrix transparency, particle concentration, particle size, matrix thickness, reflectivity of the backing material, brightness of the charging light, and duration of charging.

Figure 1:
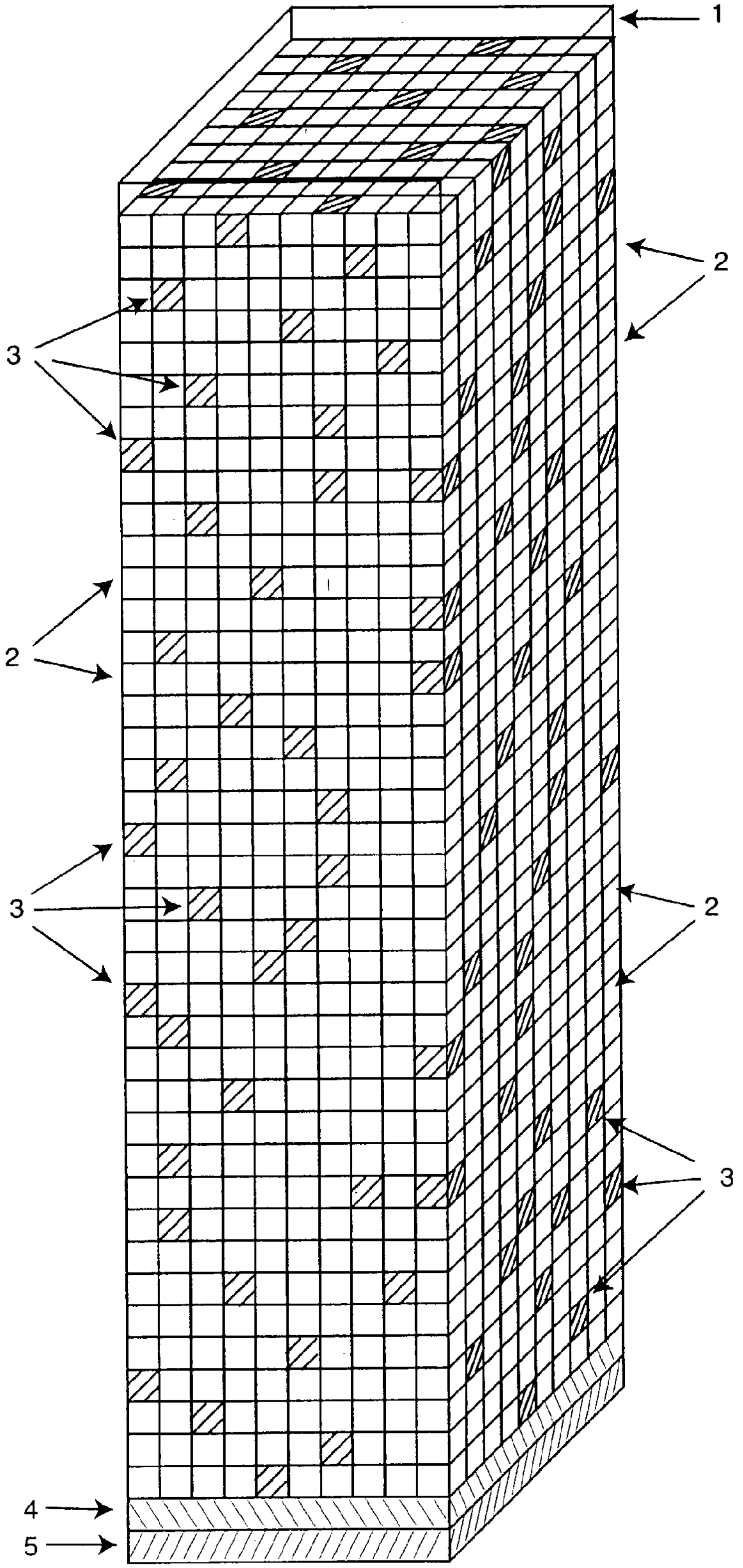
FIG. 1 is a schematic diagram of a unidirectional phosphorescent laminate in accordance with the present invention including a clear protective cover film (1), a clear matrix material (2), a phosphorescent powder (3), a reflective layer (4), and a protective film (5)
Figure 2:
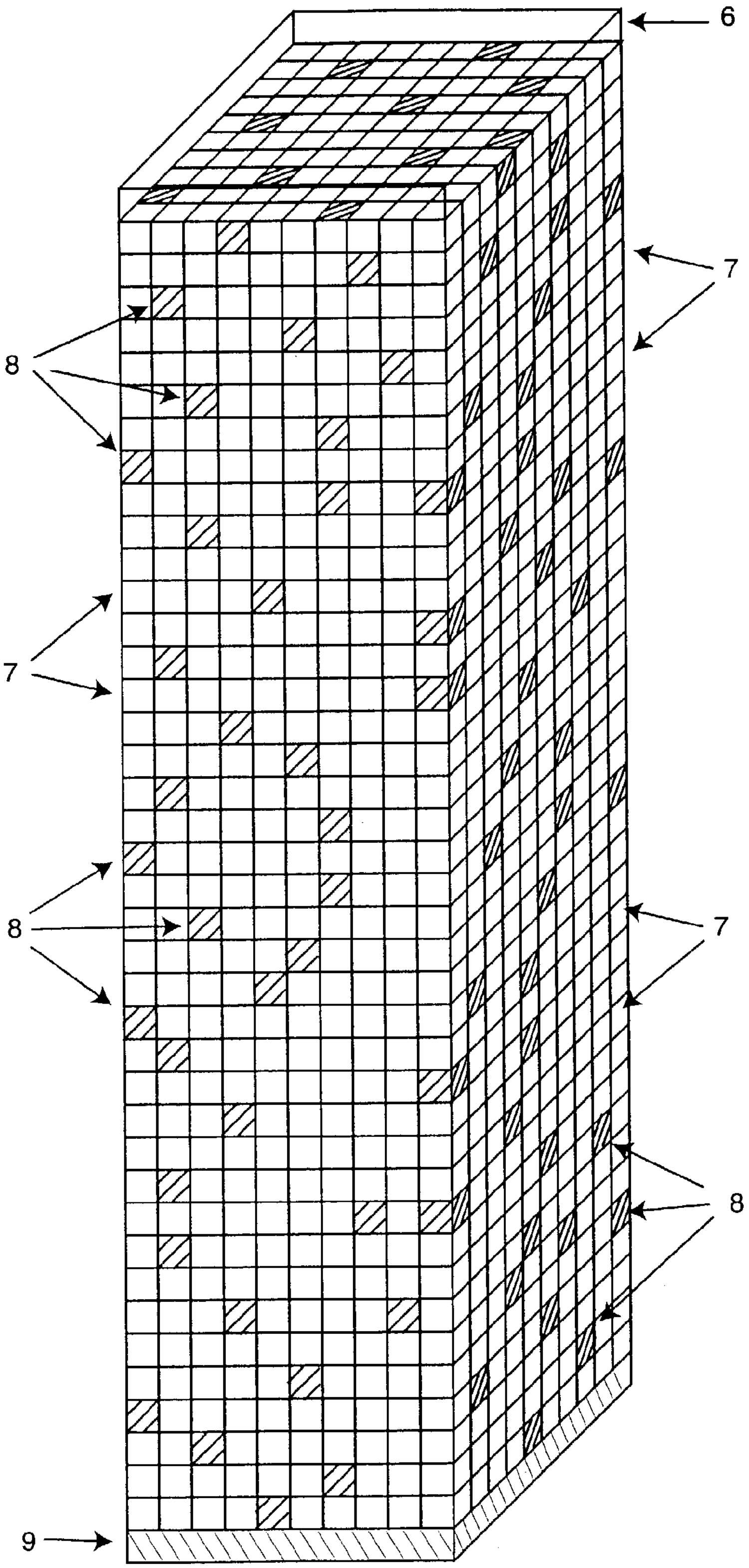
FIG. 2 is a schematic diagram, similar to FIG. 1, of a bi-directional phosphorescent laminate in accordance with the present invention, including a clear protective cover film (6), a clear matrix material (7), a phosphorescent powder (8), and a protective cover film (9)
Figure 3:
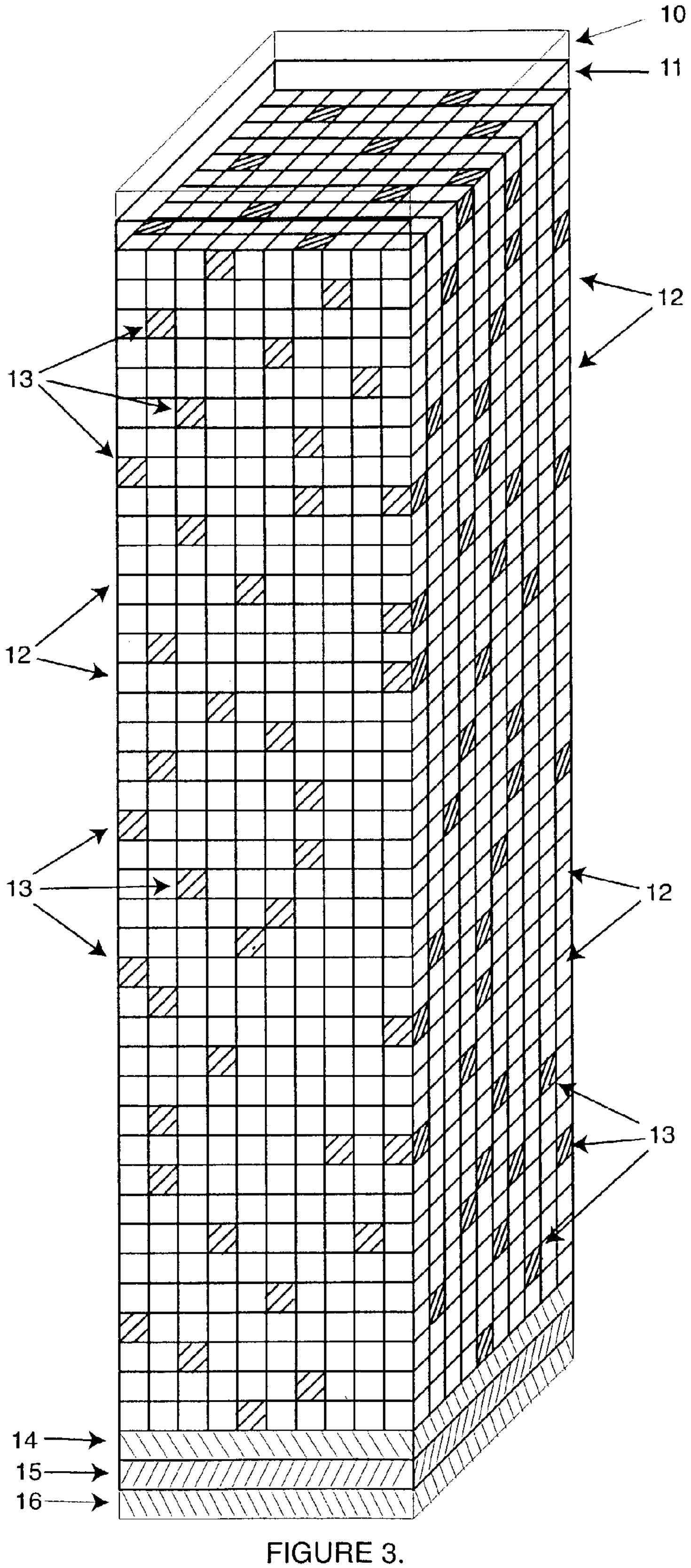
FIG. 3 is a schematic diagram, similar to FIGS. 1–2, of a single directional phosphorescent laminate in accordance with another embodiment of the invention, including a vapor and oxygen barrier layer (10), a clear protective cover film (11), a clear matrix material (12), a phosphorescent powder (13), a reflective layer (14), a protective cover film (15), and a vapor and oxygen barrier layer (16)
Figure 4:
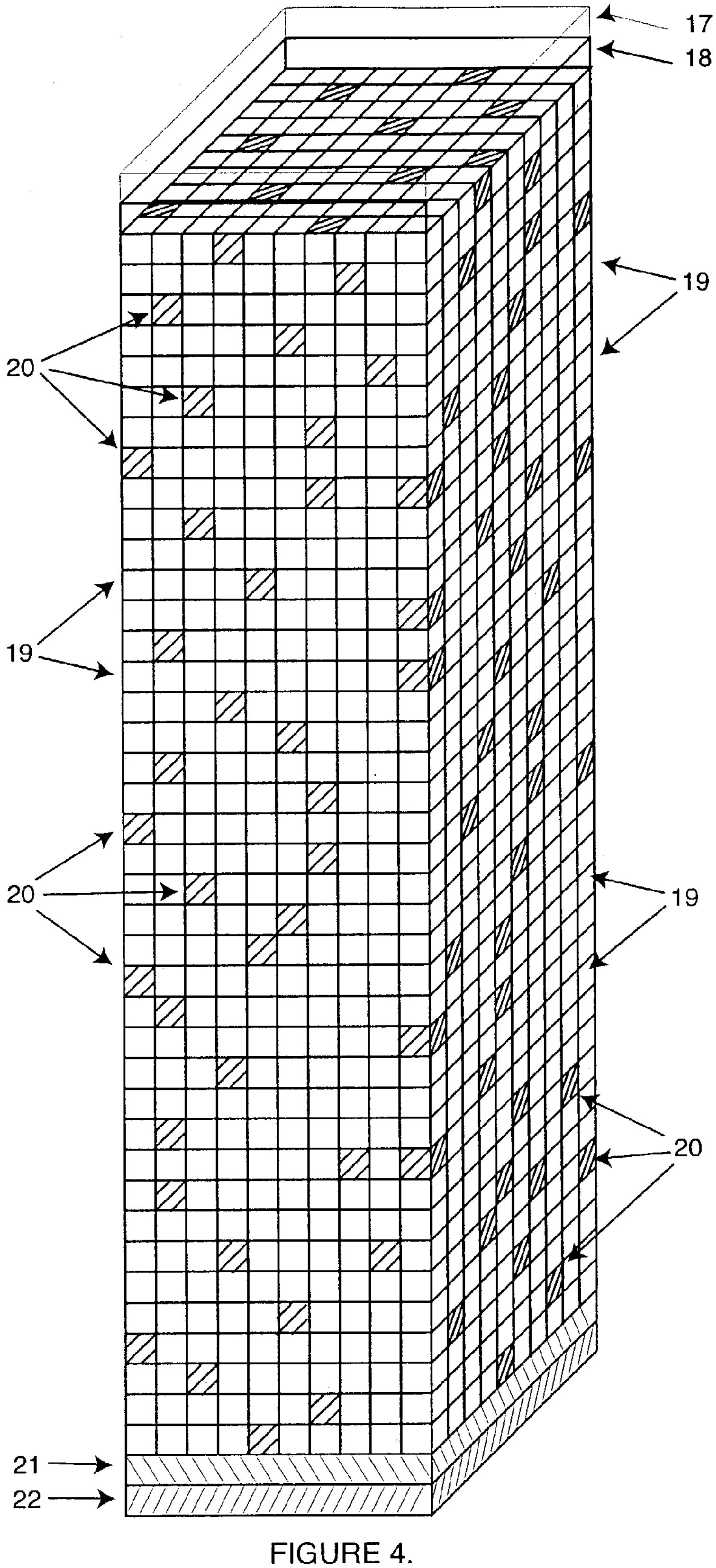
FIG. 4 is a schematic diagram, similar to FIGS. 1–3, of a bi-directional phosphorescent laminate in accordance with another embodiment of the invention, including a vapor and oxygen barrier layer (17), a clear protective cover film (18), a clear matrix material (19), a phosphorescent powder (20), a protective cover film (21), and a vapor and oxygen barrier layer (22)
Figure 5:
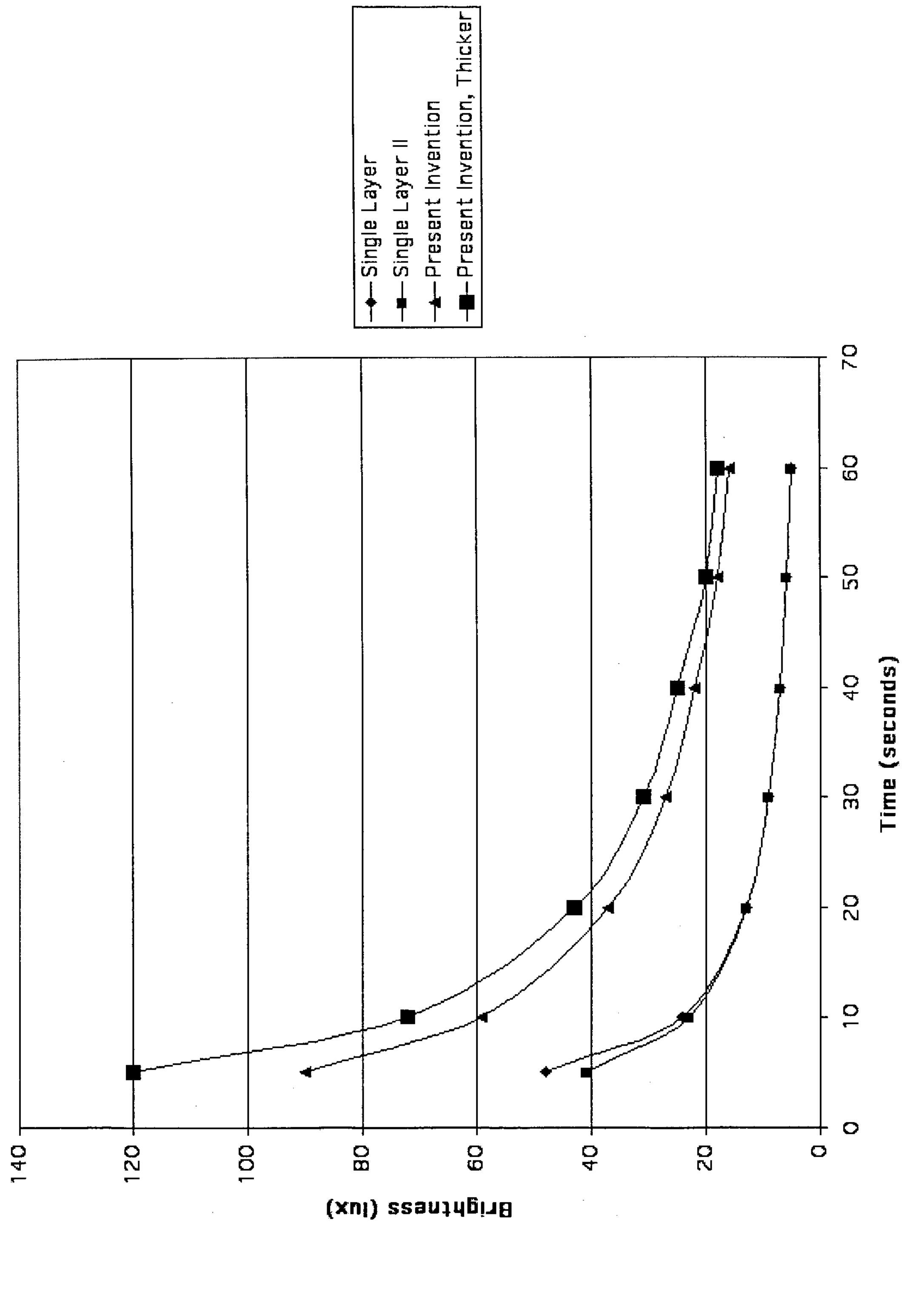
FIG. 5 is a graph of light emission with time from a phosphorescent laminate similar to that in FIG. 1, compared with that from a prior art panel with a single, nearly solid layer of phosphorescent powder, also backed by a reflective layer.
Figure 6:
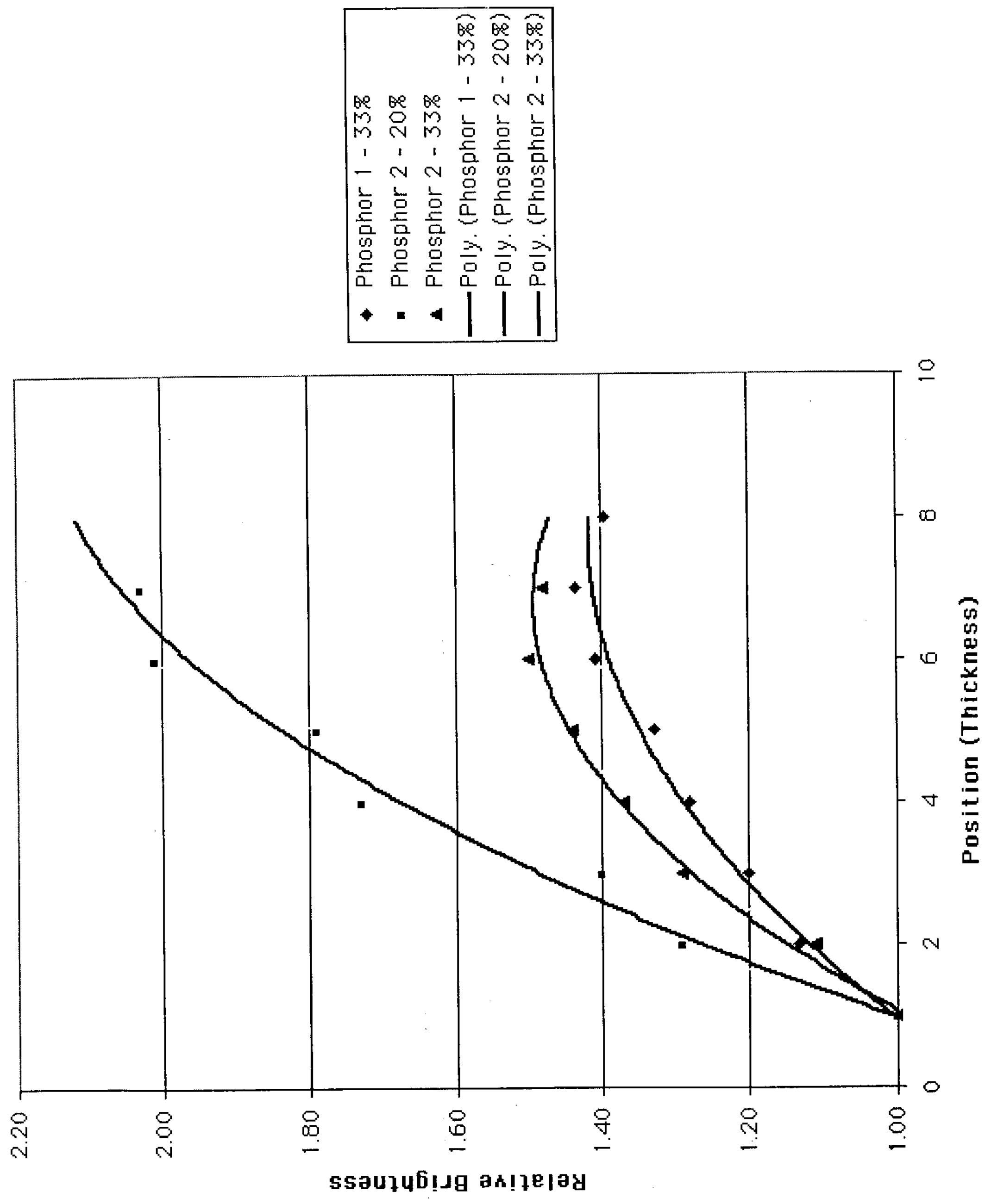
FIG. 6 is a graph showing the averaged light output for changing specimen thickness as a ratio of the output at low thickness in the same specimens.

As shown in FIGS. 1 through 4, these particle distribution and geometric factors are exploited in the present invention to produce phosphorescent panels that emit 2–4 times brighter light than do solid layers of phosphorescent particles, or prior art panels that essentially comprise a nearly solid layer of phosphorescent particles, as shown in FIG. 6. The present invention distributes phosphor particles through the thickness of a transparent layer in a panel that is many times thicker than a single phosphor layer panel. The resultant panel contains several times as much phosphor as such a single layer panel and allows a far larger number of phosphor particles to emit light. The thickness of the resulting panel is still on the order of 1 to 2 millimeters, well within a convenient range for signage and illumination, and portable applications. The quantity of phosphor required is also within a reasonable range for viable products.

It is instructive to recapitulate the engineering development process that led to the present invention to better understand how it differs from the prior art and why those differences are not obvious. The primary objective of that development effort was to produce the brightest practical phosphorescent article. Toward that end, measurements were made of the light emission from 1) a smooth, thin, high concentration phosphor laminate with a reflective back surface, and the same laminate configured to form an enclosed cavity that was solidly lined with phosphor laminate, with only the sensor of the light meter excepted. The emission curves for these two cases are plotted in FIG. 7. It can be seen that the thin but solid layer of phosphor material had much lower brightness than an enclosed cavity.

Figure 7:
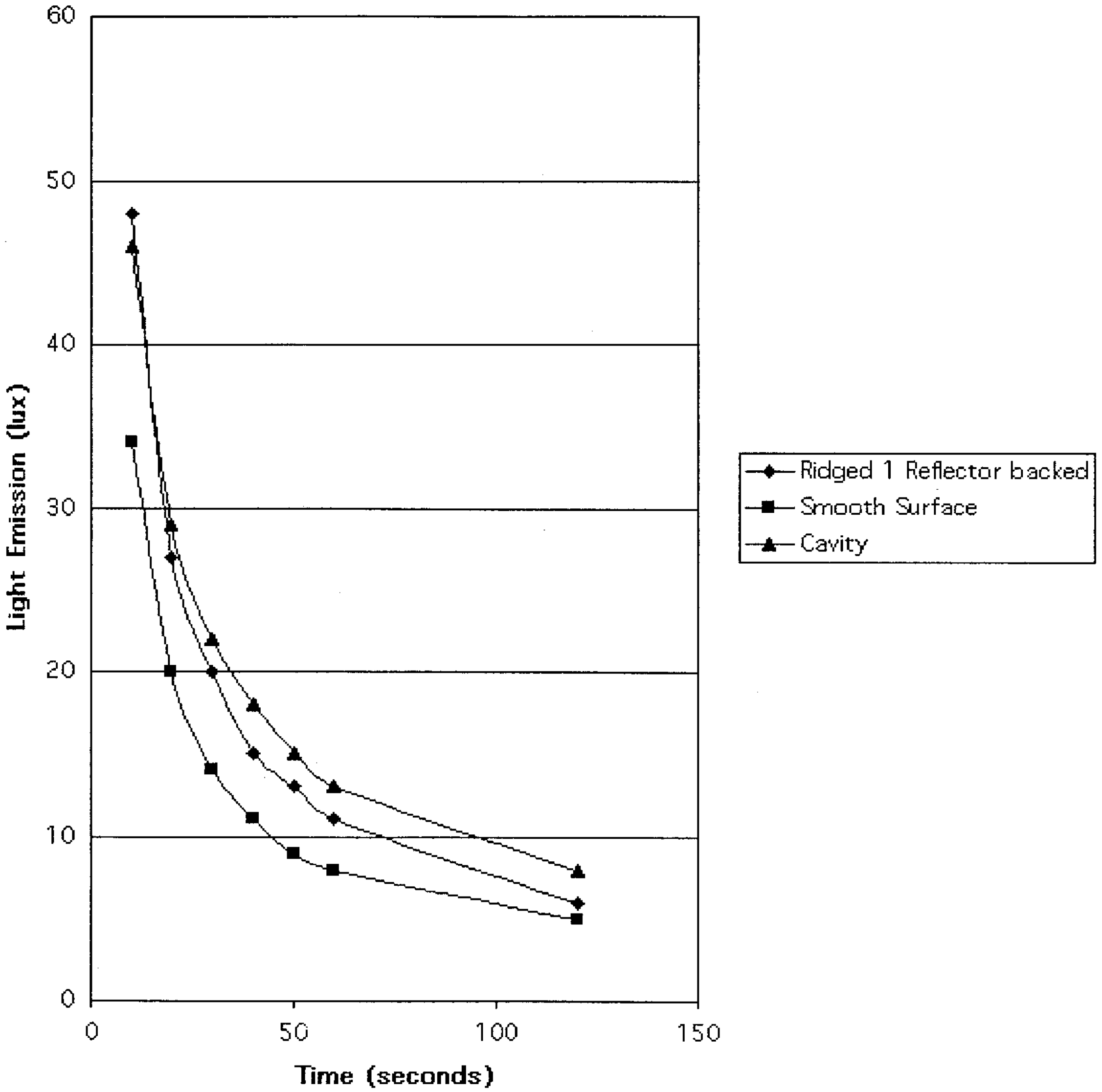
FIG. 7 is a graph of light output from a smooth, thin, reflector-backed phosphor layer, a cavity surrounded on all sides except for the light detector by a smooth, thin, phosphor layer, and a ridged-surface, reflector-backed phosphor layer.

Based on this result, it was believed that a brighter emission surface could be obtained by corrugating that surface, packing a greater amount of surface area into the same space and so allowing a greater emitting area to present. Light from the deep folds on that corrugated, or pleated surface, would reflect off from the higher portions of the corrugations and add to the overall brightness of the panel. In fact, this effect was observed, as the brightness plot for the "Ridged, Reflector Backed" specimen, also shown on FIG. 7 shows. This single, corrugated surface emitted almost as bright a light as did the fully enclosed phosphorescent cavity.

Experiments were then performed to increase this effect, working with fractal morphologies and deeper pleats, and deep "V" geometry surfaces. All of these configurations yielded higher luminosities per projected unit area than a single, solid, monolayer of high concentration phosphor. It was then realized that it might be possible to obtain the same effect as a corrugated surface by suspending a large amount of phosphor throughout a deep, transparent material in a controlled concentration. A special type of test specimen was developed, which allows multiple effective specimens to be combined within a single test for optimization of emission, thickness, and phosphor particle concentration. Surprisingly, it was found that even though the amount of phosphor involved is far greater than that required to completely, solidly cover the surface with a single layer of phosphor particles, continued increases in emissions occurs. This sharply contrasts with the reasonable expectation, practiced in all prior art, that any increase in phosphor layer thickness beyond that required to completely cover the area would be wasted, as the deeper phosphor would be occluded by the surface layers.

In fact, by limiting the phosphor particle concentration, avenues are created for the absorption and emission of light in a manner closely analogous to the avenues provided by a corrugated surface. In this manner, very deep phosphor particles, embedded hundreds of particle sizes deep within the transparent layer can participate in the absorption and emission of light and improving panel performance. For most applications, a concentration in the range of about 8–15% by volume is suitable, with about 10% by volume being generally optimal. In contrast, if the prior art structures using high concentrations of powder, in the range of 70 to 85 wt % are used, such emissions would be blocked and the surface luminosity would be no greater than that produced by a thin specimen no matter how thick the specimen is made. The continued increase in brightness with a thickness much greater than that anticipated in the prior art is shown in FIG. 6, wherein the horizontal scale ranges from a thickness of approximately 30 particle diameters (horizontal scale 1, used as unit brightness on an arbitrary scale) to over 100 particle diameters.

Although the multiple effective layers of phosphor used in the present invention are less efficient in light output per unit phosphor powder than a single, nearly solid monolayer, the brightness per unit area of panel is much higher. A panel that incorporates 5 times as much phosphor as a single, solid layer, and which disperses that phosphor according to the present invention and which is reflectively backed according to the present invention, will be approximately 2.5 times as bright as a solid, single surface of identical phosphor powder. This amounts to a lower efficiency than the prior art, but a much greater brightness per unit area of panel. Since the cost of the phosphor powder is only a few dollars per square foot of such a high output panel, and the thickness of the high emission panel is only 1–2 millimeters, such lower efficiency is a small, and acceptable price.

FIGS. 1 through 4 show schematic diagrams of such panels, wherein the phosphorescent powder, which is actually needlelike in morphology, is depicted as cubes for the sake of clarity. The scale of the thickness of the present invention is indicated in these figures by showing a panel with the transparent layer being 30 times the dimension of the phosphor particles, such a thickness being on the lower limit of the desirable thickness for the present invention, which ranges up to 1 or 200 times the particle dimension.

The efficiency of phosphor utilization may be optimized by the use of the testing and design optimization invention described in a forthcoming patent disclosure, "Phosphorescent Panel Optimization Method." That invention allows a phosphorescent panel designer to tailor panel properties to predetermined criteria with a minimal effort.

Two contrasting objectives arise from different commercial objectives for phosphorescent products. One, achieving the greatest possible light output, regardless of the amount of phosphor used, is an objective where cost is not the primary consideration, but performance is. For the second, cost limiting applications, achieving the maximum light output for a limited amount of phosphor is the primary objective. In either case, a system to optimize phosphor concentration and distribution provides valuable tool. It is desirable for such a phosphor development system to be adaptable to either objective, or to any predetermined optimal configuration in between.

Achieving the maximum possible emission of light from phosphorescent material can also be improved by devising special optical configurations of the material that further enable multiple emissions and reflections, enhancing light output per unit projected surface area, such as the corrugations pleats, or bubbles previously described. By these means, compact emission sources can be produced that offer greater utility than those requiring extended sources for the same light output.

It is to be recognized that these and various other alterations, modifications, and/or additions may be introduced into the constructions and arrangements of parts described above without departing from the spirit or ambit of the present invention as defined by the appended claims.

What is claimed is:

1. A luminous panel, comprising:

a transparent layer with thickness between about 1 millimeter and about 3 millimeters; and phosphorescent powder incorporated in said transparent layer in an amount between about 8 volume percent and about 15 volume percent of said transparent layer;

whereby a high brightness, bidirectional phosphorescent panel is obtained.

2. A luminous panel comprising:

a transparent layer with thickness between about 750 microns and about 2,000 microns;

phosphorescent powder incorporated in said transparent layer in an amount between about 8 volume percent and about 15 volume percent of said transparent layer; and a reflective backing layer contiguous to said transparent layer;

whereby a high brightness, unidirectional phosphorescent panel is obtained.

3. The luminous panel of claim 1, further comprising:

a first protective polymer film layer, comprising:

a flexible film layer about 25 to 50 microns in thickness; and a moisture and oxygen barrier coating on said film layer; and a second protective polymer film layer, comprising:

a flexible film layer about 25 to 50 microns in thickness; and a moisture and oxygen barrier coating on said film layer;

whereby said phosphorescent powder in said transparent layer is protected from exposure to moisture and oxygen.

4. The luminous panel of claim 2, further comprising:

a first protective polymer film layer, comprising:

a flexible film layer about 25 to 50 microns in thickness; and a moisture and oxygen barrier coating on said film layer; and a second protective polymer film layer, comprising:

a flexible film layer about 25 to 50 microns in thickness; and a moisture and oxygen barrier coating on said film layer;

whereby the phosphorescent powder in said transparent layer is protected from exposure to moisture and oxygen.

5. The luminous panel of claim 3, further comprising:

a protective polymer film layer comprising an ultraviolet light rejecting layer.

6. The luminous panel of claim 4, further comprising:

a protective polymer film layer comprising an ultraviolet light rejecting layer.

7. The luminous panel of claim 3, wherein each of said protective polymer film layers further comprises:

an adhesion promotion layer, comprising:

a surface treatment applied to said polymer film layer; and a transparent adhesive binder coating on said flexible film layer.

8. The luminous panel of claim 4, wherein each of said protective polymer film layers further comprises:

an adhesion promotion layer comprising:

a surface treatment applied to said polymer film layer; and a transparent adhesive binder coating on said flexible film layer.

9. A luminous panel, comprising:

a phosphorescent powder having a predetermined particle size; and a layer of light-transmitting material having said phosphorescent powder embedded therein, said layer of light-transmitting material having a thickness which is multiple times greater than said particle size of said phosphorescent powder;

said phosphorescent powder being distributed in said light-transmitting material, in a concentration of about 15 volume percent or less and in an amount greater than would form a single particle-thick layer on a surface of said layer of light-transmitting material.

10. The luminous panel of claim 9, wherein said light transmitting material is substantially transparent.

11. The luminous panel of claim 9, wherein said light transmitting material is substantially translucent.

12. The luminous panel of claim 9, wherein said phosphorescent powder is distributed in said layer of light transmitting material to a depth greater than about 30 times said particle size of said phosphorescent powder.

13. The luminous panel of claim 12, wherein said depth to which said phosphorescent powder is distributed in said layer of light transmitting material is in the range from about 50 to about 200 times said particle size of said phosphorescent powder.

14. The luminous panel of claim 13, wherein said concentration of said phosphorescent powder is in the range from about 8 volume percent to about 15 volume percent of said light transmitting material.

15. The luminous panel of claim 13, wherein said concentration of said phosphorescent powder is about 10 volume percent of said light transmitting material.

16. The luminous panel of claim 9, further comprising:

a reflective layer mounted on a side of said layer of light transmitting material opposite said surface thereof so as to reflect light radiated by said powder back through said layer of light transmitting material towards said surface thereof.

17. The luminous panel of claim 9, further comprising:

a layer of substantially transparent, UV-rejecting material mounted over said surface so as to protect said layer of light transmitting material and said phosphorescent powder embedded therein.

18. The luminous panel of claim 9, further comprising:

a layer of substantially transparent, oxygen and moisture excluding material mounted over said surface so as to protect said layer of light transmitting material and said phosphorescent powder embedded therein.

* * * * *